United States Patent [19]

Jung

[11] Patent Number: 4,670,222

[45] Date of Patent: Jun. 2, 1987

[54] LEACHING APPARATUS

[76] Inventor: Lothar Jung, 1355 Plymouth Rd., Bridgewater, N.J. 08807

[21] Appl. No.: 795,878

[22] Filed: Nov. 7, 1985

[51] Int. Cl.⁴ ............................................. B01D 11/02
[52] U.S. Cl. .................... 422/113; 422/203; 422/208; 422/261; 422/290; 422/296; 23/293 R; 141/59; 141/302
[58] Field of Search ............... 422/113, 129, 203, 208, 422/241, 261, 283, 290, 295, 296; 23/293 R; 141/59, 302; 366/182

[56] References Cited

U.S. PATENT DOCUMENTS

| | | | |
|---|---|---|---|
| 1,570,854 | 1/1926 | Nordell | 422/261 |
| 2,526,463 | 10/1950 | Ferguson | 422/241 |
| 2,592,419 | 4/1952 | Harper et al. | 422/241 |
| 3,260,285 | 7/1966 | Vogt | 141/59 |
| 3,884,279 | 5/1975 | Rademacher et al. | 141/59 |

*Primary Examiner*—David L. Lacey
*Attorney, Agent, or Firm*—Pahl, Lorusso & Loud

[57] ABSTRACT

A high pressure reaction vessel has a container portion and a removable head portion which houses a flow channel or channels, valve members and valve operators and which seals and covers the container portion. Each channel terminates at a tapered valve seat angled at at least 36° with respect to the horizontal and each of the valve members is provided with a mating tapered surface which is wedged more tightly within the valve seat as pressure within the vessel increases. A port and a chute are provided for introducing a particulate solid feed through at least one of the channels into the interior of the vessel. In one embodiment a dip tube depends from a second valve seat (in communication with a second channel) and extends to a point adjacent the bottom of the container portion. In the preferred embodiments the head portion is surrounded by a removable flange having a central tapered opening and is in the form of a plug member in which the channels are formed and which carries the valve seats, valve members and valve operators. The circumference of the plug member is tapered to mate with the tapered surface of the removable flange in such a way that increasing pressure within the vessel enhances the seal between the plug member and the central opening of the removable flange. In one embodiment the body portion of the reaction vessel is provided with a liner of a halogenated hydrocarbon resin which extends upward to a seal between the tapered surfaces of the plug member and the central opening of the removable flange and is pinched more tightly therebetween as pressure within the vessel increases. In another embodiment the liner is tubular and similar removable flanges, with mating plug members, are provided at the top and the bottom of the container with a wedged valve and valve seat providing for solids discharge through the bottom plug member.

15 Claims, 4 Drawing Figures

LEACHING APPARATUS

FIELD OF THE INVENTION

This invention relates to apparatus for leaching in general and to a pressurized vessel for leaching particulate $SiO_2$ in particular.

BACKGROUND OF THE INVENTION

Particualte $SiO_2$, whether it be natural or manmade crystalline (quartz) or amorphous (fused quartz or fused silica), typically contains external impurities, internal impurities (occluded and interstitial) and lattice impurities. High purity particulate $SiO_2$, containing low or undetectable levels of these types of impurities, is required in substantial quantities for the manufacture of fused quartz and fused silica, which materials, in turn, are used in the manufacture of semiconductor grade silicon materials and components, optical fibers for communication, lighting products, optical components and laboratory ware.

In conventional practice particulate silicon dioxide, whether manmade or naturally occuring, crystalline or amorphous, is purified by an acid leach in open, not pressurized leach tanks, using hydrofluoric acid alone or mixed with an accompanying mineral acid. After several hours of leaching the residual acids and fluorides are diluted by decanting at least five times, separated from the silicon dioxide and treated in a waste disposal system. The particulate $SiO_2$ is then dried and used as is.

The principal drawback of this conventional process is the limitation with regard to the temperature at which the leach can be carried out without excessive losses of acids through evaporation into the environment. Not only are the escaping vapors harmful to human, animal and vegetable life, they are also harmful to the plant environment in which this operation is carried out. The loss of acid vapors is also detrimental from the view point of economics in that it necessitates additions of make up amounts of acid. If carried out at higher altitudes, the evaporation of acids occur at even lower temperatures than at sea level and the problem is thereby exacerbated.

The low temperature limitations of the conventional, open system leach process result not only in longer reaction times, but also prevent adequate attack and suitable reduction and/or elimination of certain common impurities within the batch due to their low solubility at lower temperatures.

In another prior art process, perceived and described as the state of the art continuous process, a stream of particulate silicon dioxide and full strength or dilute hydrofluoric acid and/or acid mixtures are contacted in a counter flow arrangement in a closed, but not pressurized system. Due to the relatively short exposure of a specific amount of silicon dioxide to a specific amount of acid, it is necessary to recirculate the acid over and over again over the silicon dioxide in order to completely use it up, while new acid is continuously added to maintain a suitable rate of attack.

The inventor here has discovered a major drawback of the prior art "continuous" process, which involves mixing fresh with partially spent acid or acid mixtures, in that the increasing amount of dissolved impurities has a strong tendency to inhibit the attack of even the newly added acid which then results in inferior purification as compared to a batch process. In the prior art "continuous" process the originally rather pure reagents become increasingly contaminated with dissolved impurities and larger amounts of wash water are required for the removal of the added contaminants than in the older batch process. The prior art "continuous" process is furthermore limited to lower temperatures for it is not feasible to maintain counter flows at high temperatures and pressures as well.

SUMMARY OF THE INVENTION

Accordingly, it is an object of the present invention to provide apparatus permitting operation of leaches with corrosive reagents to be conducted at elevated temperatures and pressures.

As a further object of the present invention to provide a closed system for leaches, as typified by an HF leach of $SiO_2$, to prevent escape of vapors of the leach reagent into the environment.

It is yet another object of the present invention to provide a leach system having the foregoing attributes while enabling production of a leach product to proceed at higher rates than heretofore possible.

Yet another object of the present invention is to provide for careful and accurate batching of the reagents fed to the leach vessel.

Yet another object of the present invention is to provide apparatus permitting materials to be introduced into the leach vessel with the speed and in a sequence that provide for uniformity of the reaction within the batch of material undergoing leaching.

Other objects and further scope of applicablity of the present invention will become apparent to those skilled in the art from a reading of the description which follows, taken in conjunction with the accompanying drawings.

It has now been discovered that the rate of attack on particulate $SiO_2$ by conventional leaching reagents is an exponential function of temperature at any given pressure (including atmospheric pressure) and, therefore, the ability to employ higher temperatures would serve to increase productivity of any leach system. Further, the present invention reflects a preference for a batch system based on a higher uniformity of leach and the better quality control which a batch process provides. The present invention takes into account these considerations as well as the foregoing objectives.

To accomplish the foregoing objectives, the present invention provides a pressurized reaction vessel including a body portion and at least one removable head portion. A plurality (at least two) flow channels extend through the head portion (or portions) to allow for introduction and removal of various reagents and materials to and from the interior of the reaction vessel. Each flow channel terminates at a valve seat formed at the interior surface of the removable head portion. The valve seats are sloped at an angle of at least 36° with respect to the horizontal, preferably about 60°, and widen toward the vessel interior. A valve member is mounted within each channel for reciprocating movement between open and closed positions with respect to its respective valve seat. Each valve member has a tapered surface of the same angular configuration as the valve seat for mating therewith. With such a structural arrangement, increasing pressures within the vessel tend to wedge the valve member more tightly within the valve seat and thereby enhance the seal therebetween.

In one embodiment a dip tube extends from one of the valve seats to a point adjacent the bottom of the body or container portion. Such a dip tube permits solids to be removed from the vessel as a slurry. In an alternative embodiment removable heads are provided at top and bottom with at least one flow channel in the top head portion and at least one flow channel (for solids discharge) in the bottom head portion.

In one preferred embodiment, intended for use with HF or another highly corrosive reagent, the valve members, the valve seats and the dip tube are all fabricated of or coated with a corrosion resistant material, such as a halogenated hydrocarbon polymer or platinum. Moreover, the interior of the vessel itself is lined with a sheet or coating of a corrosion resistant material.

The seal between the head of the vessel and the liner for the container portion of the vessel is an important aspect of the invention. In a preferred embodiment the removable head portion (or portions) includes a flange having a central opening which is tapered so that at the interior surface of the flange the diameter of the opening is significantly larger than at the exterior surface. A plug member, fabricated of or coated with a corrosion resistant material, is provided with a tapered circumferential surface for mating with the tapered surface of the central opening of the previously mentioned flange. In such an embodiment the channels and valve seats are formed with the plug member. To form a seal with the container portion of the vessel, a free end of the liner of the body or container extends between the tapered circumferential surface of the plug and the tapered surface of the central opening of the removable flange and is wedged therebetween in a manner that increasing pressure within the vessel enhances the seal. In a variation of such a seal, the liner for the body or container portion is extended between a flange surrounding the top of the container and the removable flange and compressed therebetween by bolts extending through both flanges or by other appropriate fastening means. A second liner portion extends between the tapered circumferential surface of the plug member and the tapered surface of the central opening of the flange and extends into the area between the two flanges in intimate contact with the first liner portion.

In a preferred embodiment the container portion of the vessel is provided with an outer jacket which defines an annular space surrounding the vessel for passage of a heating or cooling heat exchange fluid.

In its preferred embodiments the present invention is further provided with a safety relief valve located within a central bore formed within one of the aforementioned valve members. The safety valve is spring biased toward a closed position but, upon the pressure within the vessel exceeding a certain value, is forced upwardly to a point where fluid communication between the interior of the vessel and an exhaust port is established.

DESCRIPTION OF THE PREFERRED EMBODIMENTS

A preferred embodiment of the leach vessel of the present invention will now be described with reference to the accompanying drawings. For purposes of illustration only, operation of the leach vessel will be described in connection with an application for the purification of particulate $SiO_2$. However, those skilled in the art will recognize numerous other applications for the apparatus disclosed below which is particularly well suited for any high pressure unit process or unit operation employing a corrosive reagent.

Figure 1:
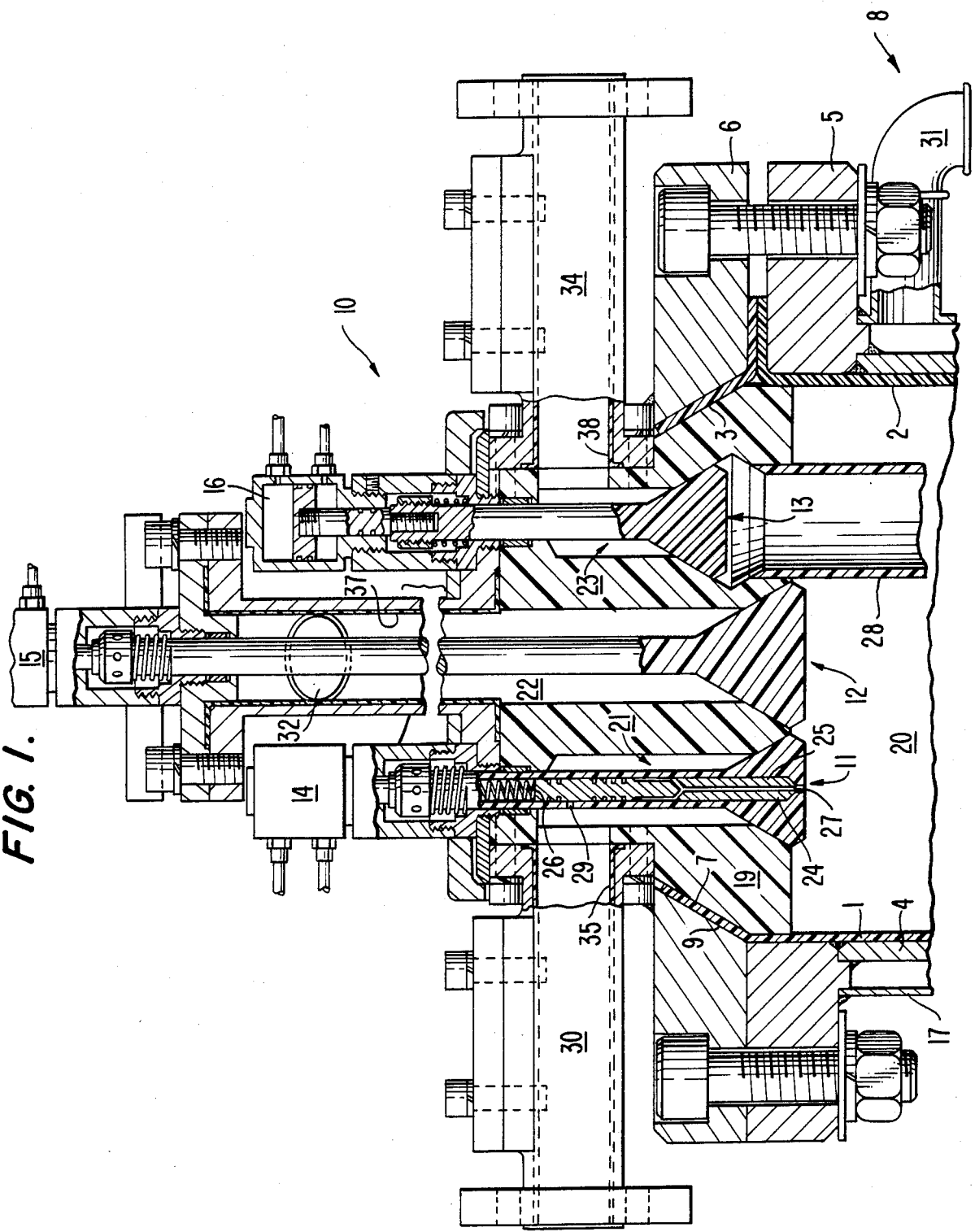
FIG. 1 is an elevational view, in cross section, of a preferred embodiment of a head portion of a reaction vessel in accordance with the present invention.

The key features of the leach vessel of the present invention are best seen in FIG. 1 which most clearly shows the interior valves, the PTFE liner and other PTFE components and the seals for the PTFE liner. The leach vessel 20 itself is essentially divided into two separate sections, a body or container portion 8 and a head portion 10. The embodiment shown in FIG. 1 is provided with three valves 11, 12 and 13 operated by pneumatic cylinders 14, 15 and 16, respectively. For use with HF, the valves 11, 12 and 13, as well as the valve seats are fabricated of or coated with a corrosion resistant material such as platinum or a high yield strength polytetrafluoroethylene, or other halogenated hydrocarbon polymer. Preferably, the yield strength of these materials will be at least 4,000 psi at room temperature.

Depending from the head portion 10 is a dip tube 28 which is in fluid communication with the valve seat for valve 13 and which extends to a point adjacent the bottom interior of body portion 8. This dip tube 28 is also fabricated of a corrosion resistant material.

An inwardly tapered valve housing member 19 is wedged within an outwardly tapered opening 9 in flange 6. The valve housing member provides three material transfer channels 21, 22 and 23 closed by valve members 11, 12 and 13, respectively. By provision of inwardly tapered circumferential surface 7, mating with the outwardly tapered surface 9, member 19 is wedged more firmly within flange 6 as the pressure within vessel 20 increases. In the embodiment illustrated in FIG. 1 surfaces 7 and 9 are sloped at an angle of approximately 60° with respect to the horizontal. In like fashion, the inward extremeties of channels 21, 22 and 23 are tapered at angles of at least 36° (the angle of repose), and preferably at least 45°, with respect to the horizontal (approximately 60° with respect to the vertical in the drawing) to define valve seats for valves 11, 12 and 13, respectively. Each of valves 11, 12 and 13 is provided with a tapered surface for mating with the respective valve seats. Accordingly, as the pressure within vessel 20 increase valves 11, 12 and 13 are likewise wedged more fimly into their valve seats.

Figure 2:
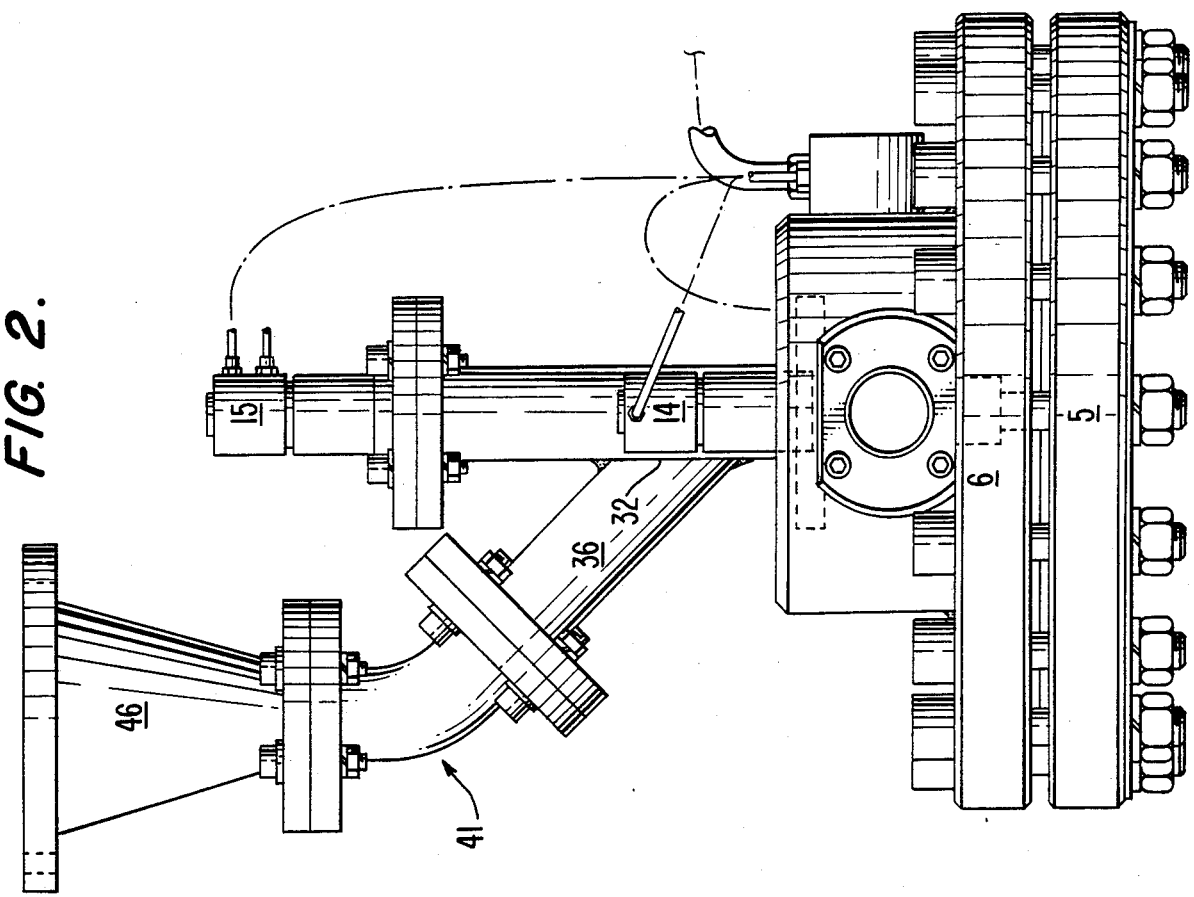
FIG. 2 is an elevational view of the exterior of the head portion shown in FIG. 1.

Valve 11 is intended to move between open and closed positions to either seal the leach vessel or to allow communication between the interior of the leach vessel and exhaust line 30 which may, for example, lead to a waste treatment facility. Valve 12 is likewise intended to provide a high-pressure seal for the vessel in its closed position. Valve 12 may be opened to allow for fluid communication between the interior of the vessel and port 32. As shown in FIG. 2, port 32 may serve as the inlet for material introduced from a hopper through line 36, e.g. particulate silicon dioxide and acid. In similar fashion, valve 13 serves to either seal the interior of the vessel against high pressure or to permit fluid communication between the interior of the vessel and the exterior through line 34.

The body portion 8 includes a circular flange 5, a cylindrical member 4 (e.g., a schedule 40 pipe) and a heating/cooling jacket 17 surrounding cylindrical member 4, and defining an annular space therebetween for receiving a heating or cooling fluid.

All interior portions of the leach vessel which are not themselves fabricated of a PTFE type material are covered with a liner of such material. It is important that a good seal be provided at the end portions of the liner so that the interior pressure can be contained. FIG. 1 serves to illustrate two different types of suitable liner seals. In the embodiment illustrated at the left hand side of FIG. 1, the liner 1 for the body portion 8 is of a single unitary construction and is wedged between flange 6 of the head portion and member 19. With such a construction, increasing pressure within the vessel tends to wedge member 19 more tightly against member 6 and thereby enhances the seal with the liner 1. In the embodiment depicted at the right hand side of FIG. 1, the liner consists of two pieces 2 and 3 pinched together between flanges 5 and 6. This latter construction does not provide for a seal that is enhanced with increasing pressure; however, it allows for disassembly of the unit, i.e., removal of the head portion 10 from the body portion 8. PTFE liners are also provided at 35, 37 and 38.

By injecting a hot or cold fluid into an inlet 33 located at the base of the leach vessel (see FIG. 3) and in communication with the annular space enclosed by the jacket 17, the leach vessel 20 may be heated or cooled as required. The heat exchange fluid exits jacket 17 at outlet 31.

FIG. 2 shows the detail for a feedchute 41 for charging materials through port 32, valve 12 and into the interior of vessel 20. The feedchute 41 includes a receiver 46 connected to the feed line 36 which is in the shape of a "Y", the axis of which intersects the axis of feed channel 32 at an angle of approximately 45°.

Figure 3:
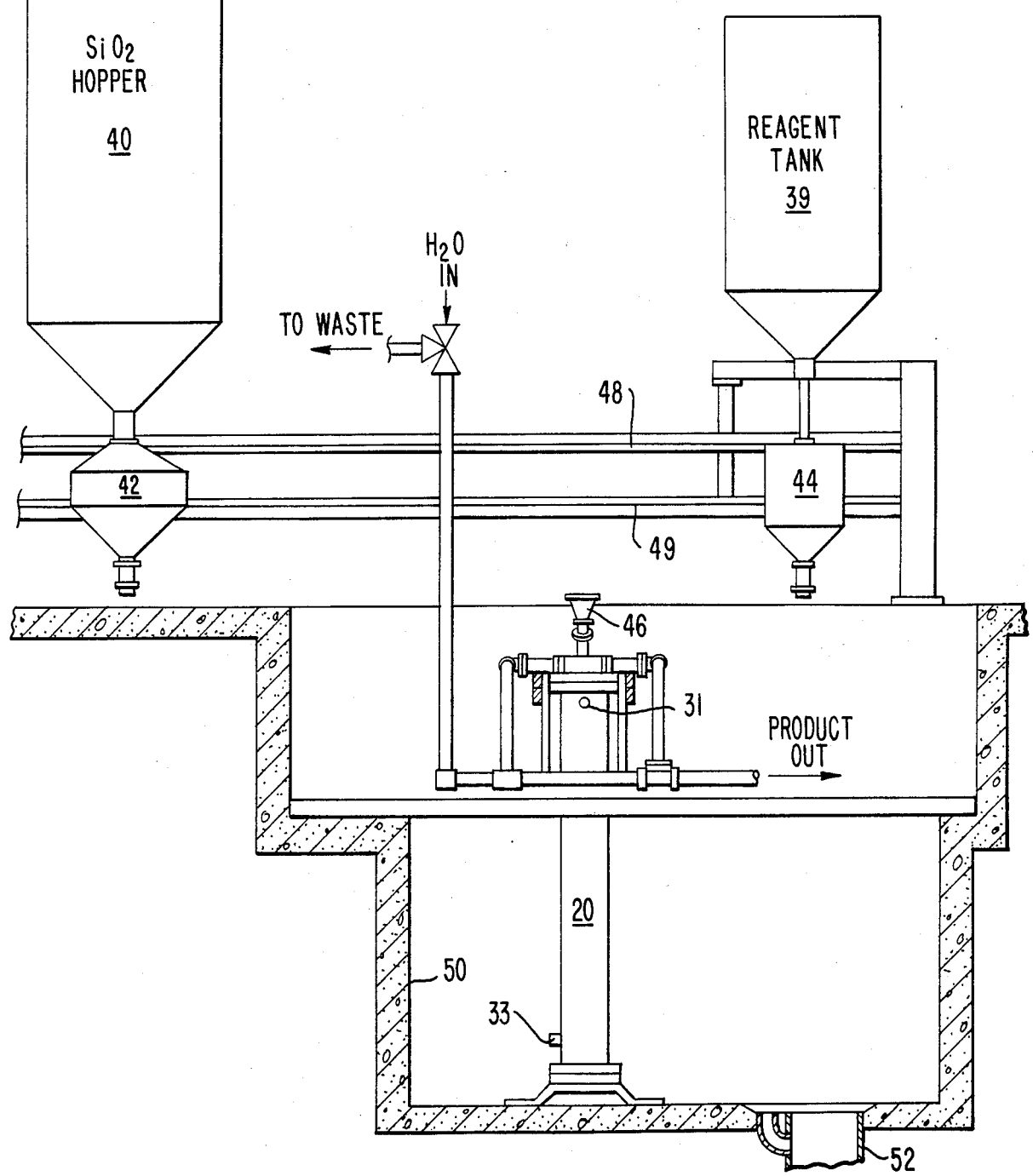
FIG. 3 is a schematic illustration of a reaction vessel in accordance with the present invention in combination with batching apparatus for charging same.

In the case of leaching a particulate material such as quartz powder, it is important that the entire batch to be leached comes into contact with the leaching reagent at approximately the same moment. Otherwise, that portion of the material to be leached which sees the reagent first will be dissolved to a greater extent than necessary before the last portion of the charge is leached to a satisfactory reagent. Accordingly, as illustrated in FIG. 3, several batching hoppers 42 and 44 are mounted on a pair of rails 48, 49 for transferring feed materials between load stations and receiver 46. FIG. 3 further shows leach vessel 20 mounted within a pit 50 having a sump 52 to protect against spillage and any potential for explosion.

To protect against excessive pressures developing within the leach vessel and the potential for rupture or explosion, a safety valve 24 is provided in valve member 11. Upon pressure reaching a predetermined value within the leach vessel, the safety valve 24 will move upwardly through a central bore 25 provided in valve member 11 against the force of spring 26 until the central passageway 27 in safety valve 24 comes into fluid communication with a relief port 29, thereby enabling the contents of the leach vessel to vent through exhaust line 30.

Operation of leach vessel 20 will now be described, by way of example, in connection with the leach of particulate $SiO_2$. Batch hopper 42 is first filled from the $SiO_2$ hopper 40 to provide a predetermined volume of particulate silica. Batch hopper 42 is then driven along rails 48, 49 by a motor or manually to a position directly above receiver 46. The vessel 20 is then charged with the contents of batching vessel 42 through line 36, channel 22 and valve 12. batching hopper 44 receives a predetermined amount of hot water near its boiling point at the load station beneath reagent tank 39, moved along rails 48 and 49 and then discharged into receiver 46, again through open valve 12 to thereby preheat the charge of particulate $SiO_2$. It would be difficult to preheat the $SiO_2$ charge simply by means of a hot fluid circulated through the heat exchange jacket 17 of vessel 20 because particulate $SiO_2$ is such a good heat insulator. However, by charging the vessel with hot water not only is heat transferred from the water to the $SiO_2$, but the water also provides a heat transfer medium through which additional heat can be transferred from a hot fluid within the jacket 17 of vessel 20, e.g., hot oil, to the $SiO_2$ charge. At this point, after the introduction of the hot water, hot oil or steam is injected into the jacket 17 of vessel 20 to further heat the charge. Pressure within the vessel can be controlled by regulation of the heat exchange fluid. Batching hopper 44 is returned to load station beneath reagent tank 39 where it receives a predetermined quantity of leach reagent, for example, hydrofluoric acid (HF). Batching hopper 44 then returns to a position above receiver 46 where the acid is discharged by gravity into vessel 20. The HF rapidly disperses through the $SiO_2$ charge by gravity. Values 11, 12 and 13 are all now closed (they are spring biased toward the closed position) and the heat and pressure within the vessel continue to rise, typically, up to a maximum pressure on the order of 300 psi and a temperature of 300°–500° F. After the leach has preceded for a predetermined period of time, valve 11 is opened to exhaust the vapors through exhaust 30 to waste treatment. Valve 13 is also opened and deionized water (approximately 3 times the volume of the leach vessel) is introduced through line 34 and dip tube 28 to wash the reagent out through open valve 11 and exhaust line 30 to waste treatment. After an approximately neutral pH is reached within vessel 20 flow is reversed with water being pumped in through line 30 and channel 21 to wash the leached product, as a slurry, through dip tube 28 and line 34. The product is then separated from the wash water and dried in a conventional manner.

At the end of the alloted reaction time, it is necessary to discharge the spent and often superheated reagents into a suitable waste disposal system, without prolonged cooling first and to otherwise prevent their instantaneous evaporation upon opening the pressurized system to the atmosphere.

Accordingly, the superheated reagents discharged from the vessel 20 are dumped into a chamber comprised of corrosion resistant piping in which the discharge is continuously mixed with cold water while being pumped to a disposal tank. The volumetric mixing ratio between spent reagents and water being such as to reduce the exit temperature from the system to approaching a temperature at which no evaporation occurs.

Figure 4:
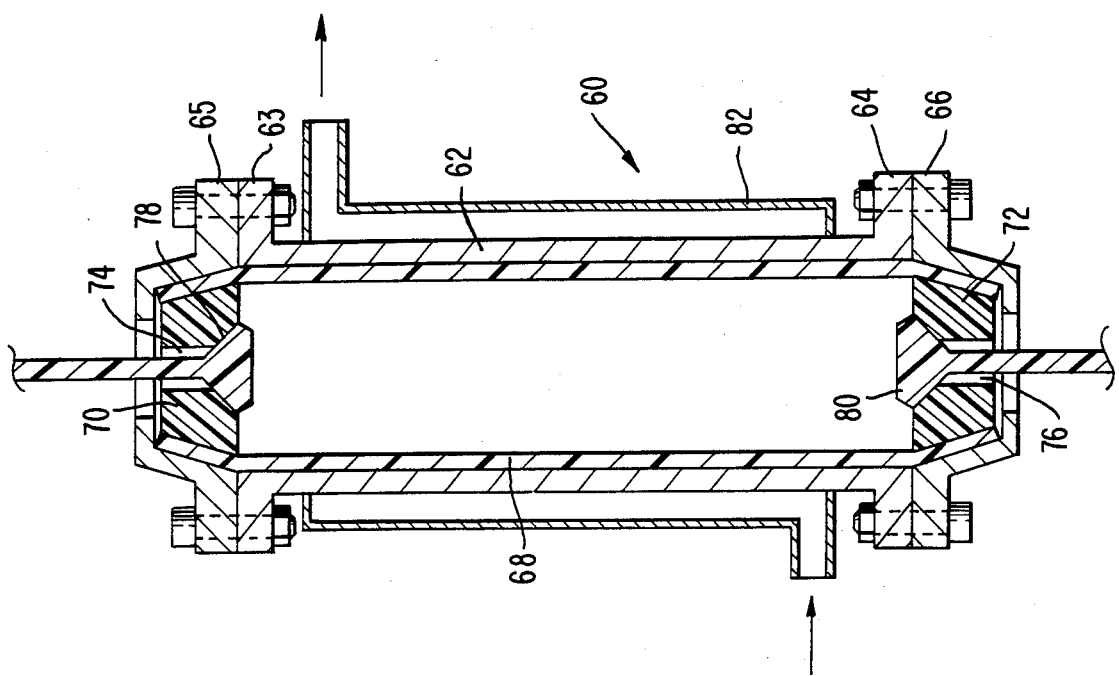
FIG. 4 is an elevational view, in cross section, of another preferred embodiment of the vessel of the present invention. The depicted embodiment having top and bottom removable heads.

FIG. 4 illustrates an embodiment adapted for solids discharge through a bottom opening. FIG. 4 shows a vessel 60 having a generally cylindrical body portion 62 with flanges at 63 and 64 and removable flanges 65 and 66 covering 63 and 64, respectively. The cylindrical body portion 62 is open at its top and bottom and is lined with a tubular member 68 of, for example, PTFE. As in the embodiment of FIG. 1, flanges 65 and 66 are each provided with a central opening and plug members 70, 72 are wedged therein in the manner described in connection with FIG. 1. Also as in FIG. 1, each end of the tubular member 68 is sealed between the tapered surfaces of one of the central openings and a plug member. Plug members 70, 72 are provided with central channels 74 and 76, respectively, each of which widens at the interior to form a valve seat. Valve members 78 and 80 are mounted within channels 74 and 76, respectively, for reciprocating movement relative to the valve seats, between open and closed positions. A jacket 82 provides for heating and cooling. Solids and reagents are introduced through channel 74 and removed through channel 76.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within in the meaning and range of equivalency of the claims are therefore intended to be embraced therein.

I claim:

1. A high-pressure reaction vessel comprising:
    a container portion with a closed bottom, an interior and a first flanged opening at at least one end thereof;
    a first head portion for closing said container portion;
    means for securing said first head portion to the first flanged opening of said container portion;
    a first valve seat formed in said first head portion, said first valve seat being tapered to widen toward the interior of said container portion;
    at least a first material transfer channel extending through said first head portion and having one end opening into said first valve seat;
    a first valve member mounted within said first channel and having an interior face and a tapered surface for mating with the first valve seat, whereby pressure within the vessel tends to wedge the first valve member tighter within the first valve seat; and
    solids discharge means for removing particulate solids from the vessel.

2. A reaction vessel in accordance with claim 1 additionally comprising a first removable flange having a central opening defined by a tapered surface so that the outer diameter of the central opening is smaller than the inner diameter of the central opening and wherein said first head portion is a first plug member fitted within said central opening and having a tapered circumference mating therewith whereby pressure within the vessel tends to wedge the first plug member more tightly with the opening of said first removable flange.

3. A reaction vessel in accordance with claim 2 wherein said container portion is provided with a corrosion resistant liner and wherein a free end portion of said liner is wedged between the tapered circumference of said first plug member and the tapered surface defining said central opening.

4. A reaction vessel in accordance with claim 2 wherein said container portion is provided with a corrosion resistant liner and wherein a free end portion of said liner is clamped between said first removable flange and the first flanged opening of said container portion and wherein a second liner portion is provided between the tapered surface of said central opening and the tapered circumference of said first plug member, said second liner portion having a free end which is also clamped between said first removable flange and the first flanged opening of said container portion.

5. A reaction vessel in accordance with claim 2 wherein said solids discharge means comprises:
    a second channel extending through said first plug member and terminating at a second valve seat tapered to widen toward the interior of said container portion;
    a second valve member mounted within said second channel and having a tapered surface for mating with said second valve seat, whereby pressure within the vessel tends to wedge the second valve member more tightly within said second valve seat; and
    a dip tube extending from said second valve seat to a point adjacent the bottom of said container portion.

6. A reaction vessel in accordance with claim 2 wherein said first valve member and first valve seat are fabricated of or coated with a halogenated hydrocarbon polymer.

7. A reaction vessel in accordance with claim 1 wherein the taper of at least the tapered surface of said first valve member and said first valve seat within said first channel is at least 36° with respect to a plane perpendicular to the longitudinal axis of said reaction vessel.

8. A reaction vessel in accordance with claim 1 wherein said solids discharge means comprises:
    a second channel extending through said first head portion and terminating at a second valve seat tapered to widen toward the interior of said container portion;
    a second valve member mounted within said second channel and having a tapered surface for mating with said second valve seat, whereby pressure within the vessel tends to wedge the second valve member more tightly within said second valve seat; and
    a dip tube extending from said second valve seat to a point adjacent the bottom of said container portion.

9. A reaction vessel in accordance with claim 8 wherein said first and second valve members, first and second valve seats, and dip tube are fabricated of or coated with a halogenated hydrocarbon polymer.

10. A reaction vessel in accordance with claim 1 wherein said container portion is of a generally cylindrical configuration and has a second flanged opening at the end of said container portion opposite said first flanged opening, said second flanged opening being covered by a second head portion, and wherein said solids discharge means comprises:
    a second material transfer channel extending through said second head portion and a second valve seat formed at the interior end of said second channel, said second valve seat being tapered to widen toward the interior of said container portion; and
    a second valve member mounted within said second channel and having a tapered surface for mating with the second valve seat, whereby pressure within the vessel tends to wedge the second valve member tighter within the second valve seat.

11. A reaction vessel in accordance with claim 9 further comprising first and second removable flanges each having a central opening defined by a tapered surface so that the diameter of the central opening opposite the interior is smaller than the diameter of the central opening at the interior and wherein said first and second head members are first and second plug members, respectively, each fitted within a respective one of central openings and each having a tapered circumference mating therewith whereby pressure within the vessel tends to wedge the plugs more tightly within said central openings, and wherein said first channel and said first valve seat are formed in said first plug member and said second channel, and said second valve seat are formed in said second plug member.

12. A reaction vessel in accordance with claim 11 wherein said container portion is provided with a tubular corrosion resistant liner having open end portions and wherein each of said end portions is wedged between the tapered circumference of a plug and a tapered surface defining a central opening.

13. A reaction vessel in accordance with claim 11 wherein said first and second valve members, first and second valve seats, and dip tube are fabricated of or coated with a halogenated hydrocarbon polymer.

14. A reaction vessel in accordance with claim 1 wherein said first valve member and first valve seat are fabricated of or coated with a halogenated hydrocarbon polymer.

15. A reaction vessel in accordance with claim 1 additionally comprising:
- a second material transfer channel extending through said first head portion and having one end opening into a second valve seat formed in said first head portion;
- a second valve member movably mounted within said second channel and having an interior face and a tapered surface for mating with the second valve seat, whereby pressure within the vessel tends to wedge the second valve member tighter within the second valve seat;
- a valve stem connected to said second valve member, said second valve member and valve stem having a central bore open at the interior face of said second valve member for fluid communication with the interior of said container;
- a relief valve mounted within said bore; and
- means for biasing said relief valve with a predetermined force toward a closed position, said relief valve being movable, by pressure within the interior of said container portion, to an open position whereat fluid communication is provided through said bore to relieve pressure from said interior.

* * * * *

UNITED STATES PATENT AND TRADEMARK OFFICE
CERTIFICATE OF CORRECTION

PATENT NO. : 4,670,222
DATED : June 2, 1987
INVENTOR(S) : Lothar Jung

It is certified that error appears in the above—identified patent and that said Letters Patent is hereby corrected as shown below:

Col. 4, line 57, "increase" should read -- increases --.

Col. 6, line 33, "Values" should read -- Valves --.

Col. 9, line 1, (claim 11, line 1), "9" should be "10".

Signed and Sealed this

Tenth Day of November, 1987

Attest:

DONALD J. QUIGG

Attesting Officer

Commissioner of Patents and Trademarks